(12) United States Patent
Kim

(10) Patent No.: US 7,499,512 B2
(45) Date of Patent: Mar. 3, 2009

(54) CLOCK TRANSMISSION APPARATUS FOR NETWORK SYNCHRONIZATION BETWEEN SYSTEMS USING AN EVEN-SECOND CLOCK AND AN UNSHIELDED TWISTED PAIR (UTP)

(75) Inventor: Seung You Kim, Bucheon-si (KR)

(73) Assignee: KTFreetel Co., Ltd., Seoul (KR)

( * ) Notice: Subject to any disclaimer, the term of this patent is extended or adjusted under 35 U.S.C. 154(b) by 612 days.

(21) Appl. No.: 10/556,554

(22) PCT Filed: May 13, 2004

(86) PCT No.: PCT/KR2004/001123

§ 371 (c)(1),
(2), (4) Date: Nov. 14, 2005

(87) PCT Pub. No.: WO2004/102865

PCT Pub. Date: Nov. 25, 2004

(65) Prior Publication Data

US 2007/0053474 A1 Mar. 8, 2007

(30) Foreign Application Priority Data

May 13, 2003 (KR) .................. 10-2003-0030067

(51) Int. Cl.
*H04L 7/00* (2006.01)

(52) U.S. Cl. ...................... 375/356; 375/354

(58) Field of Classification Search ............... 375/354, 375/356
See application file for complete search history.

(56) References Cited

U.S. PATENT DOCUMENTS

| 6,421,330 | B1* | 7/2002 | Chung et al. ............. 370/335 |
| 2002/0123365 | A1* | 9/2002 | Thorson et al. ........... 455/524 |
| 2003/0012158 | A1 | 1/2003 | Jin et al. |
| 2003/0058814 | A1* | 3/2003 | Kim ......................... 370/328 |
| 2003/0093798 | A1 | 5/2003 | Rogerson |

OTHER PUBLICATIONS

International Search Report for PCT/KR2004/001123.

* cited by examiner

*Primary Examiner*—Juan A Torres
(74) *Attorney, Agent, or Firm*—Lowe Hauptman Ham & Berner, LLP

(57) ABSTRACT

A clock transmission apparatus for network synchronization between systems wherein a communication system having a main unit and a remote unit, the main unit generates an even-second (PP2S) pulse and transmits it to the remote unit and the remote unit uses the received PP2S to generate a system clock and a 10 MHz clock, so that network synchronization is realized between two systems. Network synchronization can be maintained between two systems using a cheap UTP (Unshielded Twisted Pair) without using a GPS system and an expensive transmission line.

3 Claims, 2 Drawing Sheets

CLOCK TRANSMISSION APPARATUS FOR NETWORK SYNCHRONIZATION BETWEEN SYSTEMS USING AN EVEN-SECOND CLOCK AND AN UNSHIELDED TWISTED PAIR (UTP)

Cross Reference to Related Application

This application is the National Phase application of International Application No. PCT/KR2004/001123, filed May 13, 2004, which designates the U.S. and was published in English. This application, in its entirety, is incorporated herein by reference.

BRIEF DESCRIPTION OF THE DRAWINGS

FIG. 1a and FIG. 1b are block diagrams showing the construction of a clock transmission apparatus for network synchronization between systems according to the present invention, wherein FIG. 1a shows a clock transmission apparatus in a main unit and FIG. 1b shows a clock receiving and generating apparatus in a remote unit.

Figure 1A:
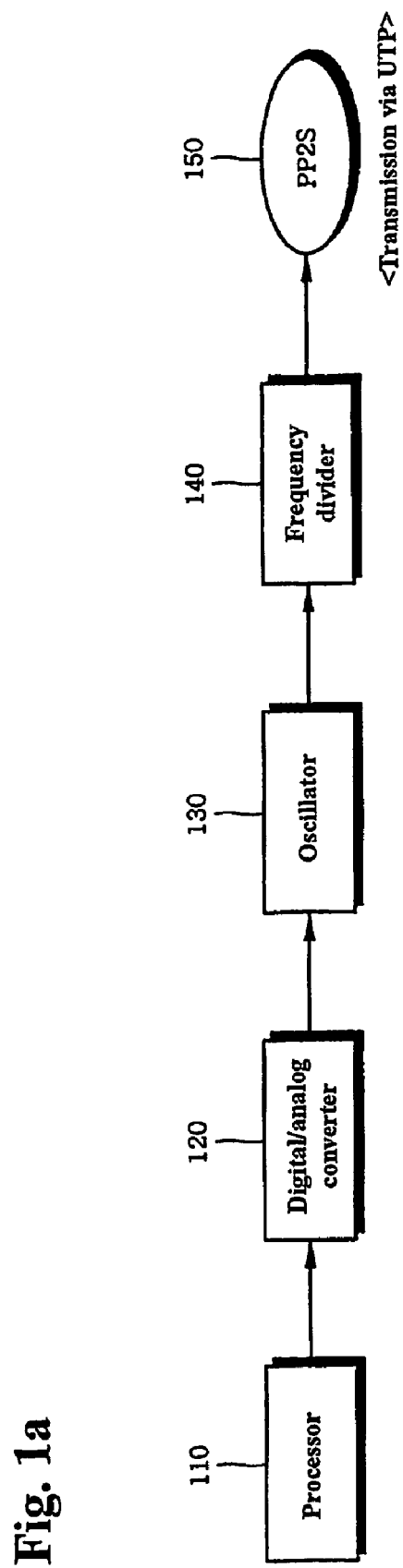

<Reference Numerals of Essential Elements in the Drawings>
110: Processor
120: Digital/Analog Converter
130, 230: Oscillator
140: Frequency Divider
150, 210: PP2S
220: Receiving Clock Synchronizer
250: Phase-Locked Loop
260: Voltage-Controlled Oscillator

TECHNICAL FIELD

The present invention relates to a clock transmission apparatus for network synchronization between two systems. More particularly, the present invention relates to a clock transmission apparatus for network synchronization between systems wherein in a communication system (especially, a very small 1×EV-DO AP system) having a main unit and a remote unit, the main unit generates an even-second pulse (PP2S) and transmits it to the remote unit and the remote unit uses the received PP2S to generate a system clock and a 10 MHz clock, so that network synchronization is realized between two systems, i.e., the main unit and the remote unit.

BACKGROUND ART

Generally, if a common base station is installed in a region where the number of subscribers is relatively smaller than the number of subscribers covered by a base station, waste occurs. In this region, a small-sized base station is installed in order to prevent such waste in advance. In this case, the small-sized base station is called "a remote unit".

A remote unit and a base station (a main unit) serving as the main are connected to each other via a costly optical cable or a coaxial cable.

Further, for network synchronization between the remote unit and the main unit, clocks such as pulse-per-second (PPS), a reference clock (10 MHz) and TOD (Time Of Day) are required.

Conventionally, there are usually two kinds of network synchronization apparatuses between the remote unit and the main unit.

For a first type network synchronization apparatus, network synchronization is implemented in such a way that the main unit generates both a reference clock and a system clock, which are required in the remote unit, and sends those clocks to the remote unit via a communication cable (an optical cable or a coaxial cable), and the remote unit receives the clocks through the communication cable.

For in a second type network synchronization apparatus, each of the main unit and the remote unit includes an expensive global positioning system (GPS) receiver, and continuously inter-compares a pulse-per-second (PPS), a reference clock (10 MHz) and TOD received from satellites using a time/frequency-generating card and corrects time generated internally and a time length, so that each of the main unit and the remote unit is synchronized to the standard time.

However, the conventional network synchronization apparatus between the remote unit and the main unit has the following problems.

That is, in case of the first type network synchronization wherein the main unit generates all the clocks needed in the remote unit and transmits them to the remote unit via the communication cable, there are lots of clocks transmitted. Thus, there is a limitation in that a single communication cable cannot be used. Also, there is a disadvantage that an expensive communication cable such as an optical cable and a coaxial cable has to be used in terms of accuracy in clock transmission.

In addition, the second type network synchronization apparatus employing the GPS receiver has a disadvantage that a costly GPS receiver is used, and hence the price of the system is increased.

More particularly, with rapid development of communication markets, if the same function is performed in the same solution under the circumstances where the system has been competitively developed, lots of limitations occurs such as the demand for development of a lower price system.

DISCLOSURE OF INVENTION

Accordingly, the present invention has been made in view of the above problems occurring in a network synchronization apparatus between two systems (a main unit and a remote unit), and it is an object of the present invention to provide a clock transmission apparatus for network synchronization between two systems wherein a main unit generates an even-second pulse (PP2S) and transmits it to a remote unit, and the remote unit receives the PP2S from the main unit to generate a system clock and a 10 MHz clock therefrom, so that network synchronization is accomplished between the two systems (the main unit and the remote unit).

To achieve the above object, the present invention allows network synchronization to be maintained between two systems using a cheap UTP. (Unshielded Twisted Pair) without using a costly GPS system (an apparatus for maintaining network synchronization of a high accuracy between the two systems) and an expensive transmission line (an optical cable or a coaxial cable).

To achieve the above object, according to the present invention, there is provided a clock transmission apparatus for network synchronization between systems, including: a main unit that generates a reference clock, frequency-divides the reference clock by a predetermined period to generate an even-second network synchronization clock, and then send out the even-second network synchronization clock via a Unshielded Twisted Pair (UTP); and a remote unit that receives the even-second network synchronization clock from the main unit via the UTP and generates a reference clock and a system clock based on the received even-second network synchronization clock for application to a system.

The main unit includes a processor for calculating a digital value to output an accurate reference clock and generating a digital signal corresponding to the digital value; a digital/analog converter for converting the digital signal applied thereto from the processor into an analog signal; an oscillator for generating an oscillating clock to correspond to the analog signal applied thereto from the digital/analog converter; and a frequency divider for dividing the frequency of the oscillating clock applied thereto from the oscillator by a predetermined period to generate an even-second network synchronization clock (PP2S) and transmits the generated PP2S to the remote unit through the UTP.

The remote unit includes a receiving clock synchronizer for receiving the even-second network synchronization clock from the frequency divider of the main unit through the UTP and generating an even-second pulse synchronized to the received network synchronization clock; an oscillator adapted to be oscillated in response to the even-second pulse applied thereto from the receiving clock synchronizer to generate a reference clock (10MHz) for application to the system; a phase-locked loop for detecting a phase difference between the even-second pulse applied thereto from the receiving clock synchronizer and a feedbacked system clock and generating a controlled voltage corresponding to the detected phase difference; and a voltage-controlled oscillator for correcting a system clock to be outputted using the controlled voltage which is outputted from the phase-locked loop, and applying an accurate system clock (19.6608 MHz) to the system.

BEST MODE FOR CARRYING OUT THE INVENTION

Now, an explanation of the preferred embodiment of the present invention will be given hereinafter with reference to accompanying drawings.

The present invention will now be described in detail in connection with preferred embodiments with reference to the accompanying drawings.

The present invention allows network synchronization to be achieved between two systems using a cheap unshielded twisted pair (hereinafter, referred to as "UTP") without using a costly GPS system (an apparatus for maintaining network synchronization of a high accuracy between the two systems) and an expensive transmission line (an optical cable or a coaxial cable).

To this end, according to the present invention, network synchronization is maintained between a main unit (MU) and a remote unit (RU) by means of PP2S (a pulse every 2-second period, also referred to as "even-second").

The concept of the present invention will be described in brief hereinafter. In order to send PP2S required in the main unit to the remote unit, an oven-controlled crystal oscillator (OCXO) has to be controlled. In order to control the OCXO, it is required that a value of a digital/analog converter be kept constantly. Therefore, a processor calculates a digital value and applies a digital signal corresponding to the calculated digital value to the digital/analog converter so that an oscillator can produce accurate 10MHz. The oscillator receives the digital signal from the digital/analog converter to generate a reference clock of a high accuracy for application to a frequency divider. The divider frequency-divides the reference clock to generate PP2S which is in turn transmitted to the remote unit through a UTP.

After receiving the PP2S, the remote unit generates a system clock and a reference clock of 10 MHz synchronized to the PP2S.

A preferred embodiment of the present invention will be described in detail hereinafter with reference to the above concept of the present invention.

Figure 1B:
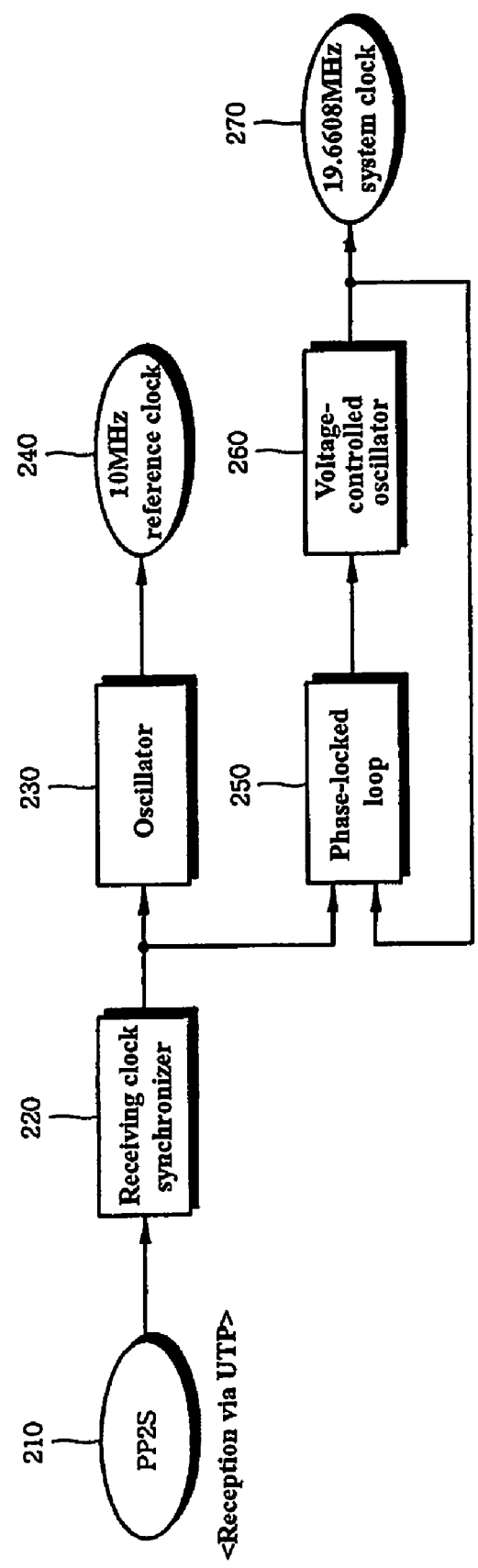

FIG. 1a and FIG. 1b are block diagrams showing a clock transmission apparatus for network synchronization between systems according to the present invention. In more detail, FIG. 1a shows a clock transmission apparatus in the main unit and FIG. 1b shows a clock receiving and generating apparatus in the remote unit.

Herein, a reference numeral 110 indicates a processor for calculating a digital value to output an accurate reference clock and generating a digital signal corresponding to the calculated digital value. A reference numeral 120 designates a digital/analog converter for converting the digital signal applied thereto from the processor 110 into an analog signal accordingly.

A reference numeral 130 indicates an oscillator for generating an oscillating clock which corresponds to the analog signal applied thereto from the digital/analog converter 120. A reference numeral 140 designates a frequency divider that divides the frequency of the oscillating clock applied thereto from the oscillator 130 by a predetermined period and generates an even-second network synchronization clock (PP2S) 150 that will be sent to the remote unit through a UTP. The above construction corresponds to the construction of the main unit.

Meanwhile, a reference numeral 220 denotes a receiving clock synchronizer for receiving the even-second network synchronization clock 210 from the main unit through the UTP and generating an even-second pulse synchronized to the network synchronization clock. A reference numeral 230 designates an oscillator that is oscillated according to the even-second pulse generated by the receiving clock synchronizer 220 to generate a reference clock (10 MHz) 240 for application to the system. A reference numeral 250 denotes a phase-locked loop that detects a phase difference between the even-second pulse applied thereto from the receiving clock synchronizer 220 and a feedbacked system clock and generates a controlled voltage corresponding to the detected phase difference. A reference numeral 260 designates a voltage-controlled oscillator that collects the system clock to be outputted using the controlled voltage, which is applied thereto from the phase-locked loop 250, and outputs an accurate system clock (19.6608 MHz) 270. The above construction is the construction of the remote unit.

The operation of the clock transmission apparatus for network synchronization between the systems constructed above will be described in detail hereinafter.

The processor 110 included in the main unit calculates a digital value to output an accurate reference clock (10 MHz) and sends a digital signal corresponding to the calculated digital value to the digital/analog converter 120. The digital/analog converter 120 receives the digital signal from the processor 110 and converts the received digital signal into an analog signal for application to the oscillator 130.

The oscillator 130 generates an oscillating clock (10 MHz) corresponding to the analog signal applied thereto from the digital/analog converter 120 for application to the frequency divider 140 which in turn divides the frequency of the oscillating clock outputted from the oscillator 130 by a predetermined period to generate the even-second network synchronization clock (PP2S) 150 that will be sent to the remote unit and transmits the generated PP2S to the remote unit through the UTP.

Thereafter, in the remote unit, the receiving clock synchronizer 220 receives the even-second network synchronization clock 210 from the frequency divider 140 of the main unit through the UTP and generates an even-second pulse (PP2S) synchronized to the received network synchronization clock.

The oscillator 230 is oscillated according to the even-second pulse (PP2S) applied thereto from the receiving clock synchronizer 220 to generate a reference clock (10 MHz) for supply to the system.

In addition, the phase-locked loop 250 detects a phase difference between the even-second pulse applied thereto from the receiving clock synchronizer 220 and a feedbacked system clock and then applies a controlled voltage corresponding to the detected phase difference to the voltage-controlled oscillator 260.

The voltage-controlled oscillator 260 corrects a system clock to be outputted using the controlled voltage which is outputted from the phase-locked loop 250, and then applies an accurate system clock (19.6608 MHz) to the system.

INDUSTRIAL APPLICABILITY

As described above, according to the present invention, a main unit transmits PP2S to a remote unit through an UTP. The remote unit receives the PP2S from the main unit to generate a system clock and a reference clock. Thus, there is no need for a costly communication cable and an expensive GPS receiver in the remote unit. Accordingly, the present invention has effects that it can save costs needed for designing a remote unit and improve economic efficiency accordingly.

While the present invention has been described with reference to the particular illustrative embodiment, it is not to be restricted by the embodiments but only by the appended claims. It is to be appreciated that those skilled in the art can change or modify the embodiments without departing from the true spirit and scope of the present invention.

What is claimed is:

1. A clock transmission apparatus for network synchronization between systems, comprising:
   a main unit that generates a reference clock, frequency-divides the reference clock by a predetermined period to generate an even-second network synchronization clock, and then send out the even-second network synchronization clock via a Unshielded Twisted Pair (UTP); and
   a remote unit that receives the even-second network synchronization clock from the main unit via the UTP and generates a reference clock and a system clock based on the received even-second network synchronization clock for application to a system.

2. The clock transmission apparatus as claimed in claim 1, wherein the main unit comprises:
   a processor for calculating a digital value to output an accurate reference clock and generating a digital signal corresponding to the digital value;
   a digital/analog converter for converting the digital signal applied thereto from the processor into an analog signal;
   an oscillator for generating an oscillating clock to correspond to the analog signal applied thereto from the digital/analog converter; and
   a frequency divider for dividing the frequency of the oscillating clock applied thereto from the oscillator by a predetermined period to generate an even-second network synchronization clock (PP2S) and transmits the generated PP2S to the remote unit through the UTP.

3. The clock transmission apparatus as claimed in claim 1, wherein the remote unit comprises:
   a receiving clock synchronizer for receiving the even-second network synchronization clock from the frequency divider of the main unit through the UTP and generating an even-second pulse synchronized to the received network synchronization clock;
   an oscillator adapted to be oscillated in response to the even-second pulse applied thereto from the receiving clock synchronizer to generate a reference clock (10 MHz) for application to the system;
   a phase-locked loop for detecting a phase difference between the even-second pulse applied thereto from the receiving clock synchronizer and a feedbacked system clock and generating a controlled voltage corresponding to the detected phase difference; and
   a voltage-controlled oscillator for correcting a system clock to be outputted using the controlled voltage which is outputted from the phase-locked loop, and applying an accurate system clock (19.6608 MHz) to the system.

* * * * *